March 19, 1940.  O. H. YOXSIMER  2,194,176
REFRIGERATOR
Filed Jan. 4, 1938   2 Sheets-Sheet 1

WITNESSES:

INVENTOR
ORLAND H. YOXSIMER.
BY
ATTORNEY

March 19, 1940.  O. H. YOXSIMER  2,194,176
REFRIGERATOR
Filed Jan. 4, 1938  2 Sheets-Sheet 2

WITNESSES:
Rq Ridge
E. H. Lutz

INVENTOR
ORLAND H. YOXSIMER.
BY
ATTORNEY

Patented Mar. 19, 1940

2,194,176

UNITED STATES PATENT OFFICE 2,194,176

REFRIGERATOR

Orland H. Yoxsimer, Springfield, Mass., assignor to Westinghouse Electric & Manufacturing Company, East Pittsburgh, Pa., a corporation of Pennsylvania Application January 4, 1938, Serial No. 183,259

5 Claims. (Cl. 62—89)

My invention relates to refrigerators having a hydrator element associated therewith, and it has for an object to provide improved apparatus of this kind.

A further object of the invention is to provide an improved arrangement of a hydrator of substantial capacity within the food storage compartment of a refrigerator which gives the visual effect of substantially the full or actual capacity of the food compartment.

Metal hydrators employed heretofore have had the effect of making the food storage chambers in which they are disposed appear much smaller than they actually are and, therefore, have caused prospective purchasers to improperly appraise the size and value of the refrigerator. This condition is particularly prevalent when the hydrator pan is relatively large and occupies a substantial portion of the horizontal area of the food compartment or when the hydrator obscures the bottom of the food compartment.

In accordance with my invention, I provide a lower shelf of transparent material, such as glass, within the compartment with a pan therebeneath that extends substantially from the bottom of the shelf to the bottom of the food compartment. Preferably, the pan is suspended from the shelf, which defines a cover for the pan. Accordingly, when viewing the refrigerator, the inside of the pan is visible and, as the bottom of the pan is contiguous to the bottom of the food storage compartment, a more correct appraisal of the volume or size of the compartment in which it is disposed may be had. This effect is enhanced when the pan is substantially coextensive with the depth and width of the compartment whereby the pan walls appear as continuations of the compartment walls and the full height and capacity of the compartment is more apparent to the observer.

Furthermore, the articles stored in the pan are visible to the person using the refrigerator, without withdrawing the pan. A further feature of this arrangement is that the effect of the high humidity obtained in the pan is visible as beads of water form on and depend from the glass cover. I have found that this exercises a favorable effect upon the user or prospective purchaser of a refrigerator employing my invention.

The foregoing and other objects are effected by my invention, as will be apparent from the following description and claims taken in connection with the accompanying drawings forming a part of this application, in which:

Figure 1:
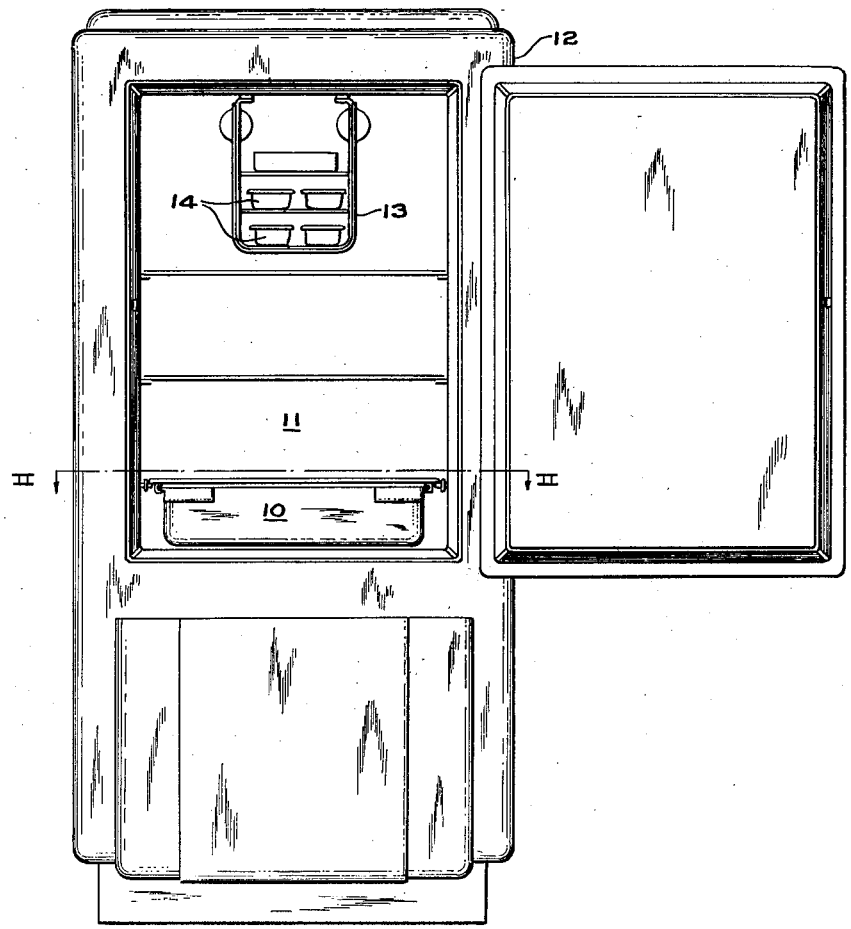
Fig. 1 is a front view of a conventional domestic refrigerator incorporating my improved hydrator.
Figure 2:
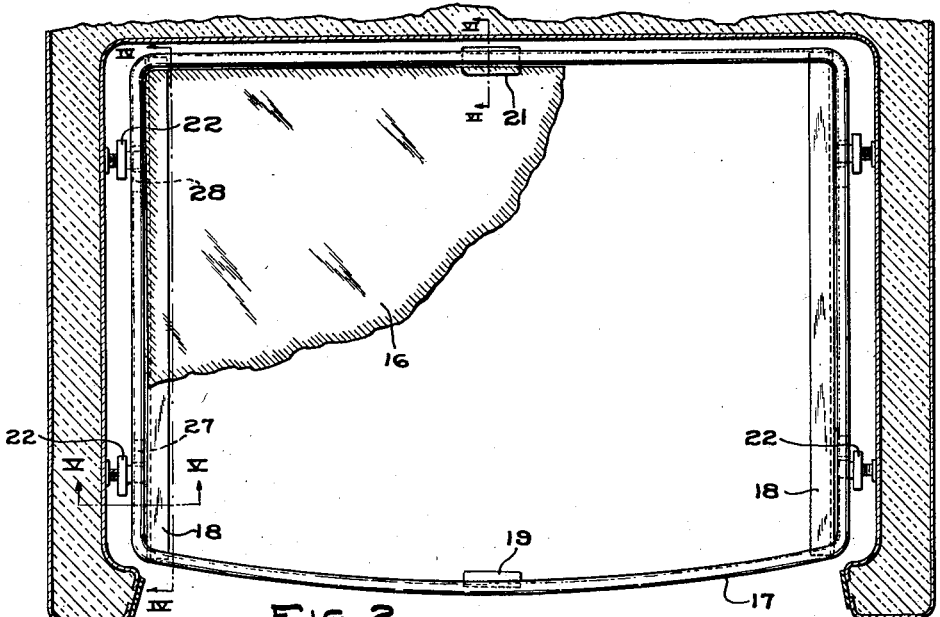
Fig. 2 is a sectional view taken along the line II—II of Fig. 1 with the hydrator pan removed and portions broken away for the sake of clearness.

Reference will now be had to the drawings wherein I have shown my improved hydrator, generally indicated at 10, disposed in the food storage chamber 11 of a conventional domestic refrigerator 12. Cooling of the air in the chamber 11 is effected by a suitable evaporator 13 which may include means for supporting trays 14 for water to be frozen.

My improved hydrator structure 10 preferably includes a pan or receptacle 15 and a transparent cover 16 that defines a shelf in the compartment 11. Preferably, the cover 16 is formed of glass and is substantially co-extensive with the depth and width of the chamber 11. The cover 16 is encompassed by a substantially rectangular rack or frame 17 having trackways 18 secured therebeneath and extending from the front to the rear of the frame 17 along each side thereof. The upper surfaces of the trackways 18 define side supports for the cover 16 and the center of the latter is supported by clips 19 and 21 secured to the under side of front and rear portions of the frame 17 intermediate its sides.

Figure 4:
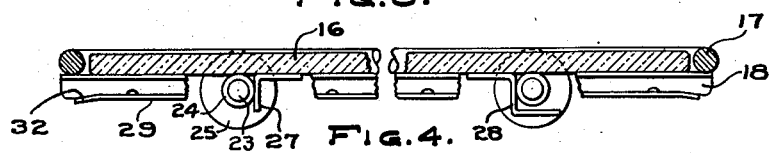
Figs. 4, 5, and 6 are sectional views of details and are taken along the respective lines IV—IV, V—V, and VI—VI of Fig. 2.
Figure 5:
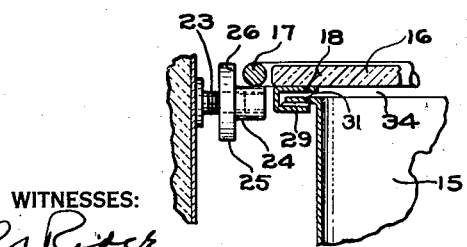
Figure 6:
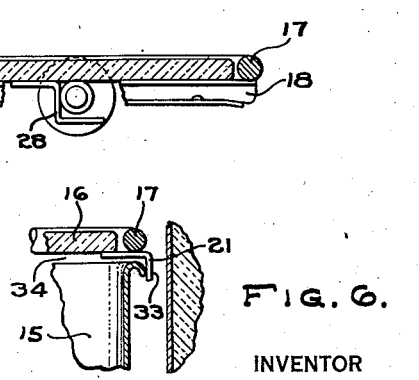

As best shown in Fig. 5, the frame 17 is supported by a plurality of supports 22 each of which includes a stud 23, secured in any suitable manner to the inner side walls of the chamber 11 and having an adjustable nut 24 threaded thereon. The frame 17 rests upon the nut 24 which may be adjusted inwardly and outwardly of the chamber 11 to allow for variations in the width of the frame and chamber. The nut 24 is preferably provided with an enlarged portion 25 by which it is rotated by the operator. The nuts 24 on opposite sides of the frame 17 may be adjusted inwardly until the side 26 of the enlarged portion 25 of the nut engages the frame 17 whereby the frame is restrained from moving laterally. Movement of the frame 17 depthwise of the chamber 11 is prevented by clips 27 and 28 secured beneath both sides of the frame and engageable with the nuts 24. See Fig. 4.

The trackways 18 include inwardly extending tracks 29 that define supporting means for the pan 15 of the hydrator. Laterally extending flanges 31 are provided on the pan 15 and rest upon the tracks 29. Preferably, the tracks 29 are bent downwardly at their front ends as shown at 32 for facilitating entry of the pan flanges 31 when inserting the pan 15 beneath the cover 16. A downwardly extending stop 33 is preferably provided on the rear clip 21 for limiting backward movement of the pan 15 and for properly positioning the same relative to the cover 16.

As will be apparent from the drawings, particularly Fig. 5, a space or passage 34 is defined between the cover 16 and the top of the pan 15. It is through this passage 34 that a limited amount of air flows between the compartment 11 and the interior of the pan 15 whereby the vitality of the food products in the pan 15 is retained over relatively long periods and bacteria and mold growth is prevented.

Figure 3:
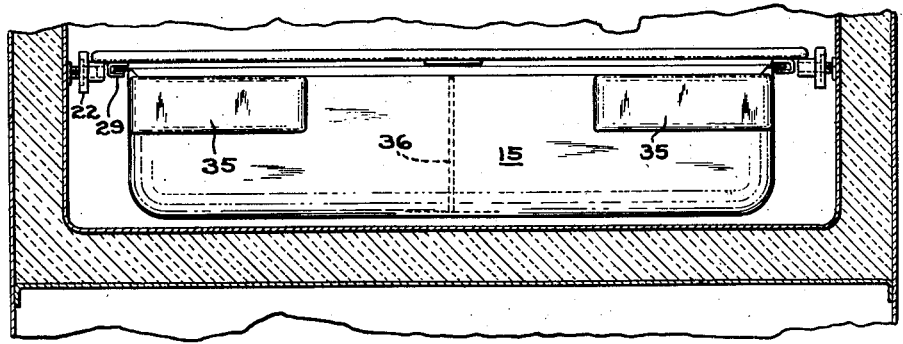
Fig. 3 is a front view of the hydrator shown in Fig. 2 with the refrigerator cabinet in section.

Suitable handles 35 may be provided on the pan 15 for facilitating handling of the same and the interior of the pan 15 may be divided into a plurality of chambers by a partition 36 shown in Fig. 3.

During the operating periods of the refrigerator, the relatively dry cold air circulating in the chamber 11 abstracts heat from the pan 15 and glass cover 16 so that the temperature of the air within the pan 15 is reduced substantially to the temperature of the air in the chamber 11. The air within the pan cools the articles stored therein as it circulates and, as a substantial portion of the moisture condensed from such air is retained in the pan, the humidity of the air is relatively high. As described heretofore, a small amount of air from the chamber 11 is permitted to circulate through the interior of the pan 15 through the restricted opening 34. Some moisture is carried from the pan 15 by th air circulated therethrough and is deposited as frost on the evaporator but it represents a very small quantity.

From the foregoing description, it will be obvious that in viewing the refrigerator 12 with my improved hydrator 10 installed therein, apparent size or capacity of the chamber 11 may be more accurately determined due to the bottom of the pan 15 being in close proximity to the bottom of the chamber 11 and the glass cover which permits observation of the bottom of the pan 15. The opposite is true where a hydrator having an opaque or a metal cover is provided as such apparatus have the disadvantage of distorting the observers' appraisal of the size of the compartment in that the compartment is made to appear much smaller than it actually is.

This result which I obtain together with the favorable effect resulting from the observers' actually seeing the moisture retained in the pan adjacent the products stored therein are important results obtained by my invention and materially assist in the sale of domestic refrigerators.

While I have shown a single pan in the embodiment disclosed, it will be understood that a plurality of pans may be suspended beneath the glass cover.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In a refrigerator cabinet, the combination of a food storage compartment, said cabinet having an access opening therein for the food storage compartment and a door for said opening, a cooling element for cooling the food storage compartment, a hydrator in the food storage compartment, a plurality of shelves disposed in the food storage compartment, and a substantially flat transparent top wall for said hydrator which forms one of said shelves, said transparent wall being solid and so positioned that its temperature is maintained sufficiently low to condense moisture on its under surface, said hydrator being so positioned in the food storage compartment that said transparent top wall is substantially below the normal eye-level of a person inspecting said food storage compartment, so that said person can view substantially the entire food storage compartment and the food and humidity conditions in said hydrator without removing any portion of the hydrator.

2. The combination set forth in claim 1 wherein the hydrator covers the entire bottom of the food storage compartment and the transparent cover extends across substantially the entire horizontal cross sectional area of the food storage compartment.

3. In a refrigerator cabinet, the combination of a food storage compartment, a cooling unit for cooling the food storage compartment, and a hydrator receptacle having a transparent top wall embodying a lower surface exposed to the interior of said receptacle, said hydrator receptacle being so located in the food storage compartment and said transparent top wall being of such heat conductivity that at least a portion of said lower surface is colder than the remainder of the hydrator receptacle, whereby the water vapor formed in the hydrator receptacle by the evaporation of free water therein will condense on said colder portion of the lower surface of the transparent top wall, said condensed moisture being visible through the transparent top wall and providing an indication of the humidity condition in the hydrator receptacle, said hydrator receptacle being slidable with respect to the transparent top wall and said transparent top wall being so arranged that movement thereof is not required to obtain access to the hydrator receptacle.

4. In a refrigerator cabinet, the combination of a food storage compartment, a cooling unit for cooling the food storage compartment, a hydrator receptacle having a transparent top wall embodying a lower surface exposed to the interior of said receptacle, said hydrator receptacle being so located in the food storage compartment and said transparent top wall being of such heat conductivity that said lower surface is chilled unevenly and at least one area is colder than the remainder of the hydrator receptacle, whereby the water vapor formed in the hydrator receptacle by the evaporation of free water therein will condense selectively on the lower surface, the size of the area of the lower surface of the transparent top wall on which the vapor condenses indicating the degree of humidity in the hydrator, said hydrator receptacle being slidable with respect to the transparent top wall and said transparent top wall being so arranged that movement thereof is not required to obtain access to the hydrator receptacle.

5. In refrigeration apparatus, the combination of a cabinet embodying an insulated chamber in which air containing water vapor is present, a substantially horizontal normally fixed partition for dividing said chamber into upper and lower food storage zones, and evaporator means for cooling the upper zone and embodying portions in the upper zone normally maintained at relatively low temperatures, said evaporator means also cooling the lower zone to temperatures above 32° over an extended heat transfer area to maintain a relatively high humidity in said lower zone for the storage of foods containing moisture, said partition providing a shelf for supporting foods in the upper zone and being formed of clear transparent material of such heat conductivity that the evaporator means in the upper zone maintains the lower surface of said partition at a lower temperature than the air in said lower zone, so that moisture from the air in the lower zone condenses on the lower surface of said partition and is visible therethrough to indicate the degree of humidity in said lower zone.

ORLAND H. YOXSIMER.